UNITED STATES PATENT OFFICE.

ANTHONY L. FLEURY, OF PITTSBURG, PENNSYLVANIA.

IMPROVED MODE OF UTILIZING COAL-DUST AND CINDER.

Specification forming part of Letters Patent No. 52,554, dated February 13, 1866.

*To all whom it may concern:*

Be it known that I, ANTHONY L. FLEURY, of the city of Pittsburg, in the county of Allegheny and State of Pennsylvania, have invented a new and useful Process for Utilizing Coal-Dust, Gas-Tar, and Petroleum Refuse with Puddling, Reheating, and Steel Furnace Slag or Cinders, and with Iron Ores, of which the following is a specification.

It is well known that only a small quantity of refuse from coal-mines and places where bituminous and other coal waste or dust is stored has heretofore been for any purpose utilized, except that of compounding what is called "artificial fuel." It is well known, also, that much refuse from gas-tar and petroleum is thrown away as useless, and that but little use has ever been made of either of them; and it is also well known that hundreds of thousands of tons of slag from puddling, reheating, and steel furnaces, containing from thirty to fifty per cent. of metallic iron, are thrown aside all over the country, and that where used in the blast-furnace their use renders inferior the yield of iron that otherwise would have been good; and it is equally as well known that many of our iron ores, on account of their admixture with sulphurets and other impurities, have never been successfully worked, and that they lay undeveloped all over the land.

By crushing or grinding the slag or cinder of puddling, reheating, or steel furnaces, or of ground iron ore, and mixing the powder with coal-dust, refuse gas-tar or petroleum, and a small percentage of a chlorine salt, and subjecting the compound to a proper degree of heat, a metalliferous coke freed of sulphur is produced, and this coke can be used in the blast or cupola or converting furnace either alone or mixed with pig or scrap iron, iron ore, and coal, thus answering the double purpose of increasing the yield of good neutral iron and furnishing fuel for the operation.

To enable others skilled in the arts to use my invention, I will proceed to describe it.

I mix with ground or crushed slag or cinder from the puddling, reheating, or steel furnace, or from ground or crushed iron ore, about half the weight thereof (more or less, according to the quantity of metallic iron supposed to be present in the slag or ore used) of bituminous coal-dust, adding thereto about one per cent. of some chlorine salt—such as chloride of sodium, chloride calcium, in powder or solution— and convert the mixture, in a suitable furnace for the purpose, into a metalliferous coke. When refuse bituminous coal is not convenient the dust or refuse of anthracite or cannel coal can be substituted with a sufficient quantity of refuse gas-tar or petroleum to cause the mixture to cake or cement together the mass.

Other beneficial salts or substances, such as carbonate or sulphate of baryta, fluor-spar, oxides of manganese, zinc, or any other substance which has the property of depriving the mixture of sulphur and other impurities, can be added to the mixture before coking.

What I claim as my invention, and desire to obtain Letters Patent for, is—

1. The utilization of refuse coal, gas-tar, and petroleum by compounding them with the slag or cinder of puddling, reheating, and steel furnaces, or with iron ore, and making from said compound a metalliferous coke.

2. For utilizing the slag or cinder of puddling, reheating, and steel furnaces by compounding them with refuse coal, gas-tar, or petroleum and making of said compound a metalliferous coke.

3. For compounding iron ore with refuse coal, gas-tar, or petroleum for making therefrom a metalliferous coke, as and for the purpose above specified.

ANTHONY L. FLEURY.

Witnesses:
BARNARD ELLIS,
WM. J. CAMPBELL.